US006033563A

United States Patent [19]

Gerteis

[11] Patent Number: 6,033,563

[45] Date of Patent: Mar. 7, 2000

[54] CENTRIFUGE WITH SLIDE-IN FILTER

[75] Inventor: Hans Gerteis, Bietigheim-Bissingen, Germany

[73] Assignee: Heinkel Industriezentrifugen GmbH & Co., Bietigheim-Bissingen, Germany

[21] Appl. No.: 09/067,993

[22] Filed: Apr. 29, 1998

Related U.S. Application Data

[63] Continuation of application No. PCT/EP96/03627, Aug. 17, 1996.

[30] Foreign Application Priority Data

Nov. 16, 1995 [DE] Germany ........................... 195 42 763

[51] Int. Cl.[7] ........................ B01D 33/067

[52] U.S. Cl. ........................ 210/232; 210/232; 210/380.3; 210/416.1; 494/38; 494/41; 494/83

[58] Field of Search ........................ 210/232, 373, 210/380.3, 416.1; 494/23, 25, 26, 38, 41, 83

[56] References Cited

U.S. PATENT DOCUMENTS 5,092,995 3/1992 Gerteis .

FOREIGN PATENT DOCUMENTS 610608 3/1935 Germany .

*Primary Examiner*—David A. Reifsnyder

*Attorney, Agent, or Firm*—Leydig, Voit & Mayer, Ltd.

[57] ABSTRACT

A centrifuge with a slide-in filter comprises a centrifuge basket, a filter cloth element which can be pushed into or out of it, and a machine housing, to which a first housing chamber with an outlet for discharging a filtrate and a second housing chamber with an outlet for discharging a filter cake are connected in the region of the centrifuge basket. The first housing chamber is sealingly enclosed by a first separate housing section and the second housing chamber is likewise sealingly enclosed by a second separate housing section. The two housing sections are mounted so that each is able to pivot in different directions around separate axes in such a way that they are pivotable individually between a closed state and an open state relative to the centrifuge basket.

6 Claims, 4 Drawing Sheets

CENTRIFUGE WITH SLIDE-IN FILTER

This application is a continuation of PCT/EP96/03627, filed Aug. 17, 1996.

The invention relates to a centrifuge with a slide-in filter according to the preamble of claim 1.

Such a centrifuge with a slide-in filter is known from DE 37 40 411 A1. In the known centrifuge with slide-in filter the first and second housing chambers are formed by immovable walls. As a result of this, access to the centrifuge basket is made difficult when cleaning operations become necessary, and cleaning of said housing chambers as such is only possible with difficulty.

DE-PS 610 608 shows a centrifuge for the separation of liquids. In this centrifuge, the cover and housing sections may be separated for opening or closing for cleaning or be pivoted together in one direction. The cover and housing sections are only conditionally accessible during cleaning.

The object of the invention is to further develop a centrifuge with slide-in filter of said type so that the centrifuge basket can be rendered easily accessible essentially from all sides, e.g. for cleaning purposes, and also so that the housing chambers enclosing the centrifuge basket are easily cleaned.

The object is achieved with the centrifuge with slide-in filter of the specified type by the characterising features of claim 1.

BRIEF DESCRIPTION OF THE DRAWINGS

An embodiment of the invention is shown in the drawing and is explained below in more detail.

Figure 1:
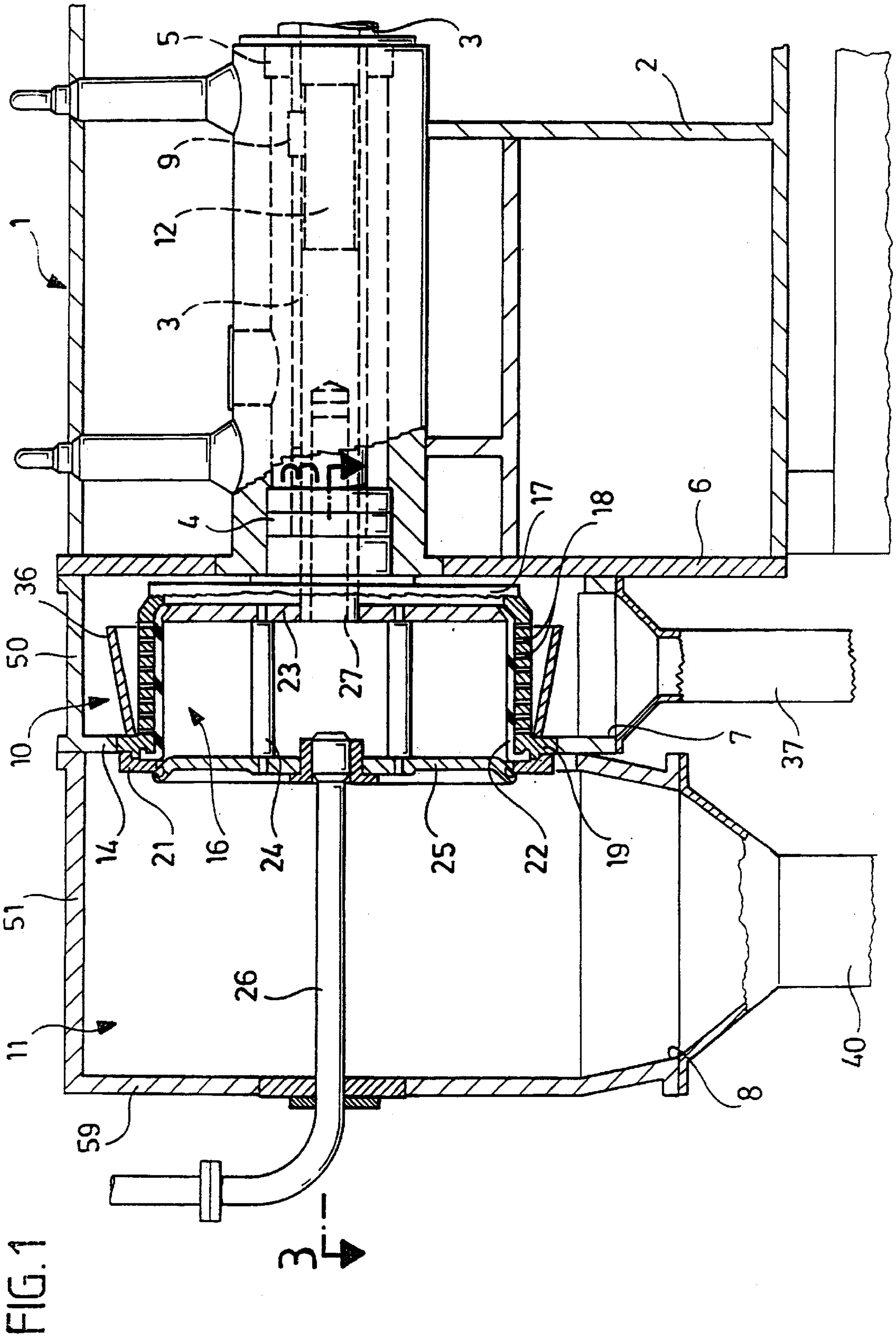
FIG. 1 schematically shows a broken away sectional view of a centrifuge with slide-in filter with closed centrifuge basket and filter cloth element in position.

The centrifuge with slide-in filter shown in the drawing comprises a schematically indicated machine housing 1 enclosing the driving part (located on the right respectively but not visible in the figures) of the centrifuge, in which machine housing a hollow shaft 3 is rotatably supported in bearings 4, 5 on a stationary machine frame 2. The hollow shaft 3 can be set in rapid rotation by means of a motor (not shown). The hollow shaft 3 extends beyond a partition wall 6 closing off the machine housing 1 at its front side and has an axially extending wedge-shaped groove (likewise not shown), in which a wedge-shaped piece 9 is axially displaceable. This wedge-shaped piece 9 is rigidly connected to a shaft 12 displaceable in the interior of the hollow shaft 3. Therefore, the shaft 12 rotates jointly with the hollow shaft 3, but is axially displaceable in this.

At its base 17, a pot-shaped centrifuge basket 16 is flange-mounted on the end of the hollow shaft 3 protruding beyond the partition wall 6, for rotation therewith. On its circular cylindrical side wall, the centrifuge basket 16 has radially extending ports 18. The centrifuge basket 16 is open at its front opposite the base 17. One edge of an essentially circular cylindrical filter cloth element 22 is tightly clamped in at a flange-like opening edge 19 by means of a retaining ring 21. In a corresponding manner, the other edge of the filter cloth element 22 is tightly connected to a base section

23, which is rigidly connected to the displaceable shaft 12 passing freely through the base 17.

Figure 2:
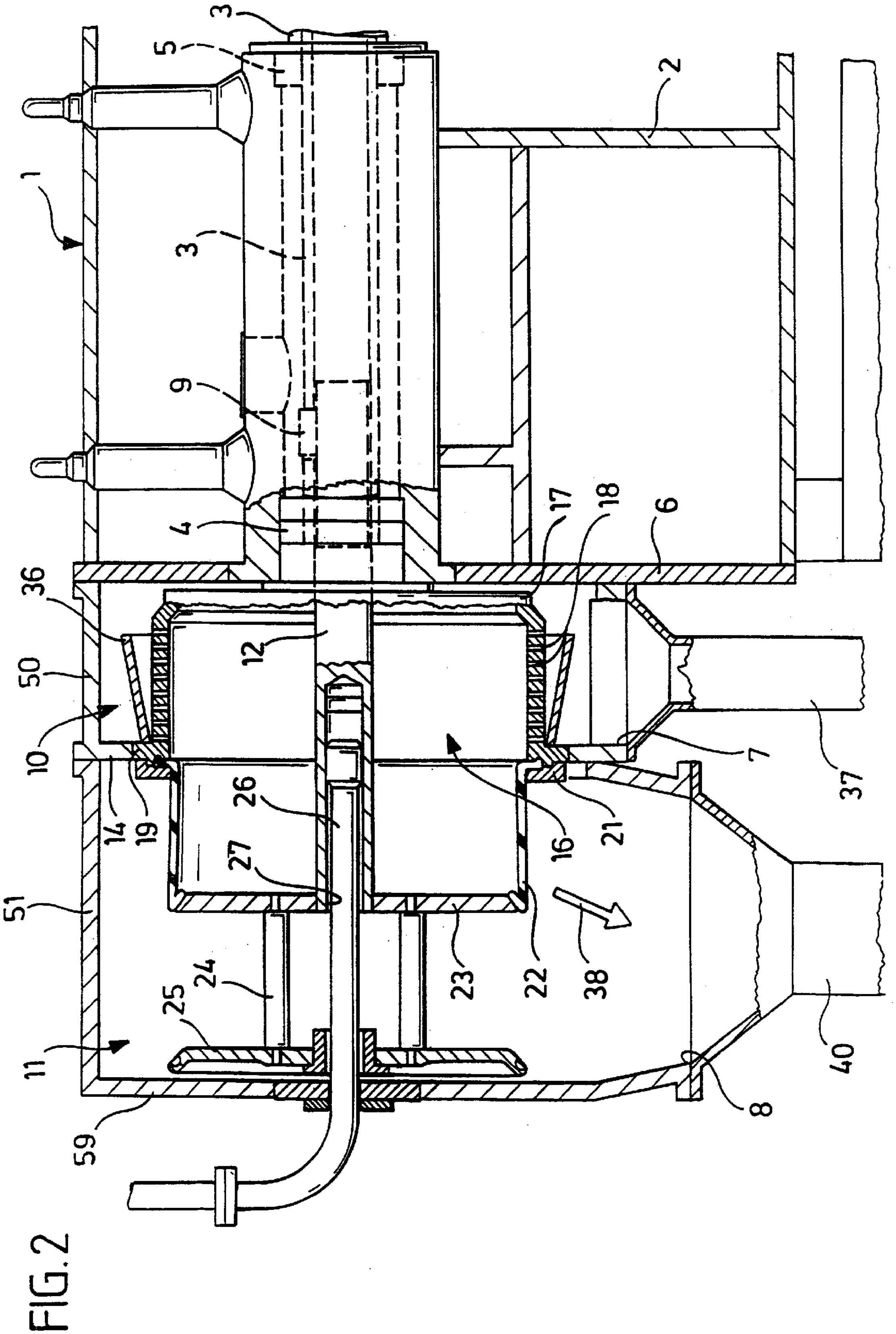
FIG. 2 shows the centrifuge with slide-in filter from FIG. 1 with open centrifuge basket and filter element out of position.

A centrifuge chamber cover 25, which in FIG. 1 tightly seals the interior of the centrifuge basket 16 by lying on its opening edge 19 and in FIG. 2 is lifted freely off the centrifuge basket 16 jointly with the base section 23 by pushing the shaft 12 axially out of the hollow shaft 3, is rigidly fastened to the base section 23 via stud bolts 24 leaving an intermediate space. In FIG. 1, the filter cloth element 22 is turned in towards the inside of the centrifuge basket 16, in FIG. 2 the filter cloth element 22 is turned over outwards.

In the region of the centrifuge basket 16, two housing chambers 10 and 11 are connected to the machine housing 1, which are separated from one another in the vicinity of the opening edge 19 of the centrifuge basket 16 by means of a ring-shaped front wall 14. The first housing chamber 10 serves to discharge a filtrate, which has passed through the ports 18 of the centrifuge basket 16 and the filter cloth element 22, and has an outlet 7 for this purpose. After the filter cloth element 22 has been turned inside out, a filter cake deposited on this element can be discharged via an outlet 8 of the second housing chamber 11.

On the front side (located to the left in the drawing) of the centrifuge with slide-in filter, a rigid possibly removable filling tube 26 is arranged which serves to supply a suspension to be broken down into its solid and liquid constituents into the interior of the centrifuge basket 16 (FIG. 1) and, in the operating state shown in FIG. 2, penetrates a hole 27 of the displaceable shaft 12, whereby the displacement of the shaft 12, and thus the opening and closing of the centrifuge basket 16, is achieved by means of driving motors (not shown, likewise located on the right of the drawing), e.g. hydraulically.

During the centrifuging operation, the centrifuge with slide-in filter assumes the position illustrated in FIG. 1. The displaceable shaft 12 is retracted into the hollow shaft 3, as a result of which the base section 23 joined to the shaft 12 lies in the vicinity of the base 17 of the centrifuge basket 16, and the filter cloth element 22 is pushed into the basket in such a way that it covers the ports 18 in its interior. The centrifuge chamber cover 25 has thereby positioned itself tightly on the opening edge 19 of the centrifuge basket 16. Suspension to be filtered continuously is fed via the filling tube 26 with the centrifuge basket 16 rotating. The liquid constituents of the suspension pass as filtrate through the filter cloth element 22 and the ports 18 into the first housing chamber 10 and are there directed by a baffle plate 36 into a discharge pipe 37 connected to the outlet 7. The solid particles of the suspension are retained in the filter cloth element 22 in the form of a filter cake.

With the centrifuge basket 16 continuing to rotate—generally more slowly—and after the suspension supply via the filling tube 26 has been turned off, the shaft 12 is then displaced (to the left) in accordance with FIG. 2, as a result of which the filter cloth element 22 is turned over outwards and the solid particles of the filter cake adhering to it are thrown outwards in the direction of arrow 38 into the second housing chamber 11. The outlet 8 of this housing chamber 11 is connected to a discharge pipe 40, via which the constituents of the filter cake can be transported away.

In the position according to FIG. 2, the filling tube 26 is passed through appropriate openings in the cover 25 or in the base section 23 into the hole 27 of the shaft 12. After ejection of the solid particles forming the filter cake by the effect of the centrifugal force has been completed, the filter centrifuge is brought into the operating position according to FIG. 1 again by pushing back the shaft 12, whereby the filter cloth element 22 is pushed back in the opposite direction. In this way, operation of the centrifuge is possible with constantly rotating centrifuge basket 16.

Figure 3:
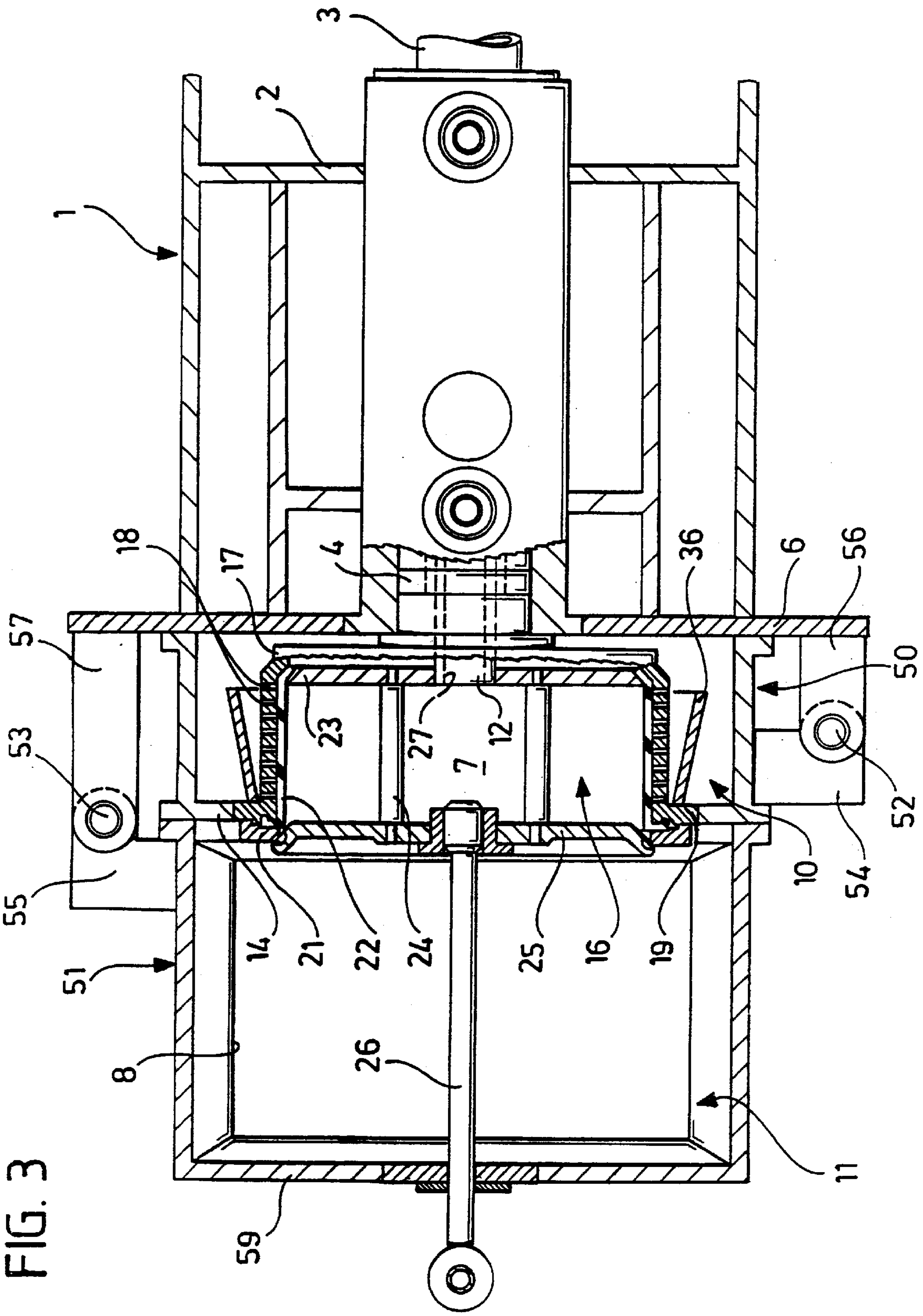
FIG. 3 shows a schematic sectional view taken along line 3—3 in FIG. 1.
Figure 4:
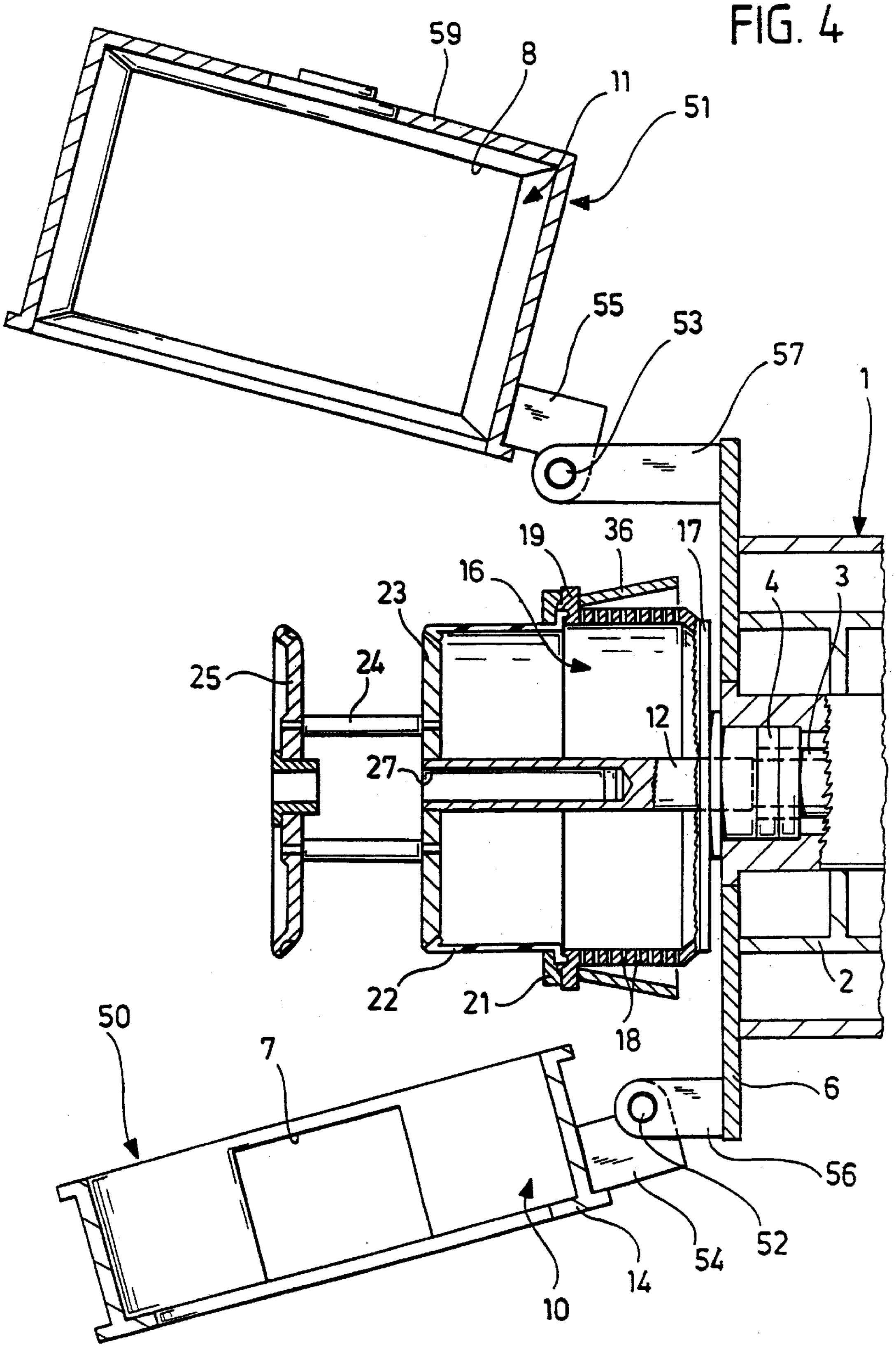
FIG. 4 is a sectional view similar to FIG. 3 with open housing sections.

The housing chamber 10 is enclosed by a separate, inherently rigid, ring-shaped, e.g. approximately circular ring-shaped, housing section 50 ("filtrate housing section"), one opening edge of which abuts against the partition wall 6 of the machine housing 1 with a seal (not shown) interposed, while the other opening edge formed by the front wall 14 adjoins the outside of the opening edge 19 of the centrifuge basket 16, likewise with a seal (not shown) interposed. The outlet 7, which connects to the discharge pipe 37 again sealed by interposed seals (not shown), is constructed on the underside of the first housing section 50. As may be seen from FIGS. 3 and 4, the housing section 50 is pivotable around a vertical axis 52 so that it may be transferred from a closed state, in which it encloses the centrifuge basket 16, into an open state. FIG. 4 shows the partially open state. The housing section 50 can be pivoted even further away from the centrifuge basket so that this is accessible—unhindered by the housing section 50—e.g. for the purpose of cleaning, without hindrance. The same naturally applies to the housing section 50 itself. As shown in FIGS. 3 and 4, the rotational axis 52 is contained by projections 54, 56 in a similar manner to a hinge, which are rigidly arranged on the housing section 50 or on the machine housing 1 (partition wall 6).

Like the first housing chamber 10, the second housing chamber 11 connecting to it is also enclosed by an inherently rigid, pot-shaped, essentially cylindrical housing section 51 ("solid housing section"). The housing section 51 has a closed front wall 59 with passage for the filling tube 26 as well as an opening edge located opposite the front wall and sealingly abutting the first housing section 50. Like the first housing section 50, the second housing section 51 is also pivotable around a vertical axis 53 (FIGS. 3 and 4), which runs through projections 55, 57 on the housing section 51 or on the machine housing 1 (partition wall 6). Housing section 51 can also be pivoted further beyond the opening position shown in FIG. 4 so as to permit completely unhindered access to the centrifuge basket 16 and housing section 51. Housing section 51 has the outlet 8 on its underside sealingly connected to the discharge pipe 40 (in a manner not shown).

However, it is also possible to bring only the second housing section 51 into the open state, but leave the first housing section 50 in the closed state. In this case, cleaning of the housing section 51 (of solid material) is possible, or the filter cloth element 22 and/or the seals on the centrifuge basket 16 can be changed.

The outlets 7, 8 on the housing sections 50 or 51 are sealed in such a way that the pivoting of the housing sections 50, 51 is not hindered, e.g. by sliding seals.

Transfer of the housing sections 50, 51 from the closed into the open state (FIG. 4) can be achieved with closed centrifugal chamber cover 25, which is only lifted off from the centrifuge basket 16 when the housing sections 50, 51 are pivoted out to an appropriate distance. However, in principle, the housing sections 50, 51 may also be dimensioned such that their transfer from the closed into the open state is possible even when the centrifuge chamber cover 25 is lifted off.

In the shown configuration of the housing sections 50, 51, the second housing section 51 is transferred from the closed into the open state first, and then the first housing section 50. Conversely, the first housing section 50 is firstly brought into tight abutment against the machine housing 1, whereupon the second housing section 51 is sealingly connected to the first housing section 50 by pivoting (FIG. 1). Before pivoting the second housing section 51 in opening position, the filling tube 26, which is constructed to be detachable for this purpose, is removed.

The filling tube 26 may also be fixedly connected to the second housing section 51, and that is in such a manner that it is released from its entry opening on the centrifuge chamber cover 25 during opening of the housing section 51 and is pivoted away together with housing section 51. In this case, a suspension supply pipe connected to the filling tube 26 outside the housing section 51 must be removed from the filling tube, or this supply pipe must be of flexible construction.

I claim:

1. A centrifuge comprising (a) a slide-in filter, (b) a centrifuge basket, (c) a filter cloth element which can be turned into or out of the centrifuge basket, and (d) a machine housing, to which a first housing chamber with an outlet for discharging a filtrate and a second housing chamber with an outlet for discharging a filter cake are connected in the vicinity of the centrifuge basket, wherein the first housing chamber is sealingly enclosed by a first separate housing section, the second housing chamber is sealingly enclosed by a second separate housing section, and the two housing sections are mounted so that each is able to pivot in different directions around separate axes in such a way that they are pivotable individually between a closed state and an open state relative to the centrifuge basket.

2. The centrifuge of claim 1, wherein the two housing sections are pivotable around vertical axes.

3. The centrifuge of claim 1, wherein the first housing section is generally of ring-shaped construction and the second housing section is constructed in the approximate shape of a pot with an essentially closed front wall, and wherein in the closed state the second housing section tightly abuts against the first housing section with an edge located opposite the front wall.

4. The centrifuge of claim 1, wherein in the closed state the first housing section tightly abuts against a partition wall of the machine housing.

5. The centrifuge of claim 1, wherein the first and second housing sections have outlets, which in the closed state of the housing sections are tightly connected to discharge pipes for the first and second housing chambers.

6. The centrifuge of claim 1, wherein the housing sections essentially have a circular cylindrical outer contour.

* * * * *